(12) United States Patent
Murthy et al.

(10) Patent No.: US 12,734,976 B2
(45) Date of Patent: Sep. 15, 2026

(54) BRACKET ASSEMBLY FOR VEHICLE CAMERA MONITOR SYSTEMS

(71) Applicant: Stoneridge Electronics AB, Solna (SE)

(72) Inventors: Banuprakash Murthy, Novi, MI (US); Fathima Irfhana, Lake Orion, MI (US)

(73) Assignee: Stoneridge Electronics AB, Solna (SE)

( * ) Notice: Subject to any disclaimer, the term of this patent is extended or adjusted under 35 U.S.C. 154(b) by 132 days.

(21) Appl. No.: 18/443,802

(22) Filed: Feb. 16, 2024

(65) Prior Publication Data

US 2025/0263022 A1 Aug. 21, 2025

(51) Int. Cl.
*B60R 11/04* (2006.01)
*B60R 1/23* (2022.01)

(52) U.S. Cl.
CPC ................ *B60R 11/04* (2013.01); *B60R 1/23* (2022.01)

(58) Field of Classification Search
CPC ....... B60R 2011/008; B60R 2011/0084; B60R 2011/0085; B60R 2011/0087; B60R 2011/0089; B60R 2011/0091; B60R 2300/802; H04N 23/51; H04N 23/54; G06V 20/56; F16M 11/06; F16M 11/08; F16M 11/10; F16M 11/105; F16M 11/125; F16M 11/126; F16M 11/128
USPC .......................................................... 348/148
See application file for complete search history.

(56) References Cited

U.S. PATENT DOCUMENTS 7,440,027 B2 * 10/2008 Weaver ................ F16M 13/027 348/375
2013/0033604 A1 * 2/2013 Ohshima ................ B60R 11/04 348/148
2021/0266429 A1 * 8/2021 Tagaya ................. H04N 23/661
2025/0018866 A1 * 1/2025 Koetje .................... B60R 1/008

* cited by examiner

*Primary Examiner* — Nathnael Aynalem
(74) *Attorney, Agent, or Firm* — Carlson, Gaskey & Olds, P.C.

(57) ABSTRACT

A camera monitor system (CMS) for a vehicle includes a wing including a housing configured to be secured to the vehicle, and a camera assembly having a camera mounted to the wing with a bracket assembly. The camera may include an image capture unit configured to provide a desired field of view of the vehicle. A display may depict at least a portion of the field of view. A controller may be in communication with the camera and the display. The bracket assembly may include first, second, and third brackets configured for adjustment of the camera with respect to first, second, and third dimensions.

19 Claims, 13 Drawing Sheets

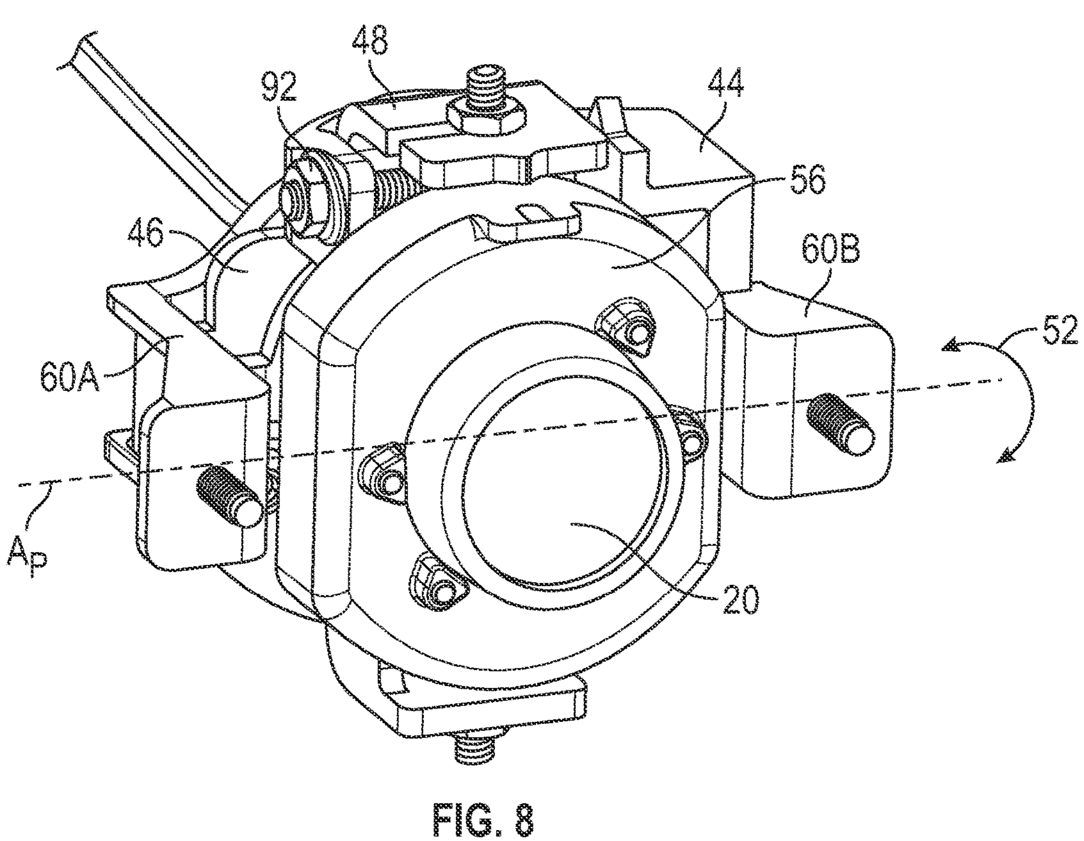
FIG. 8
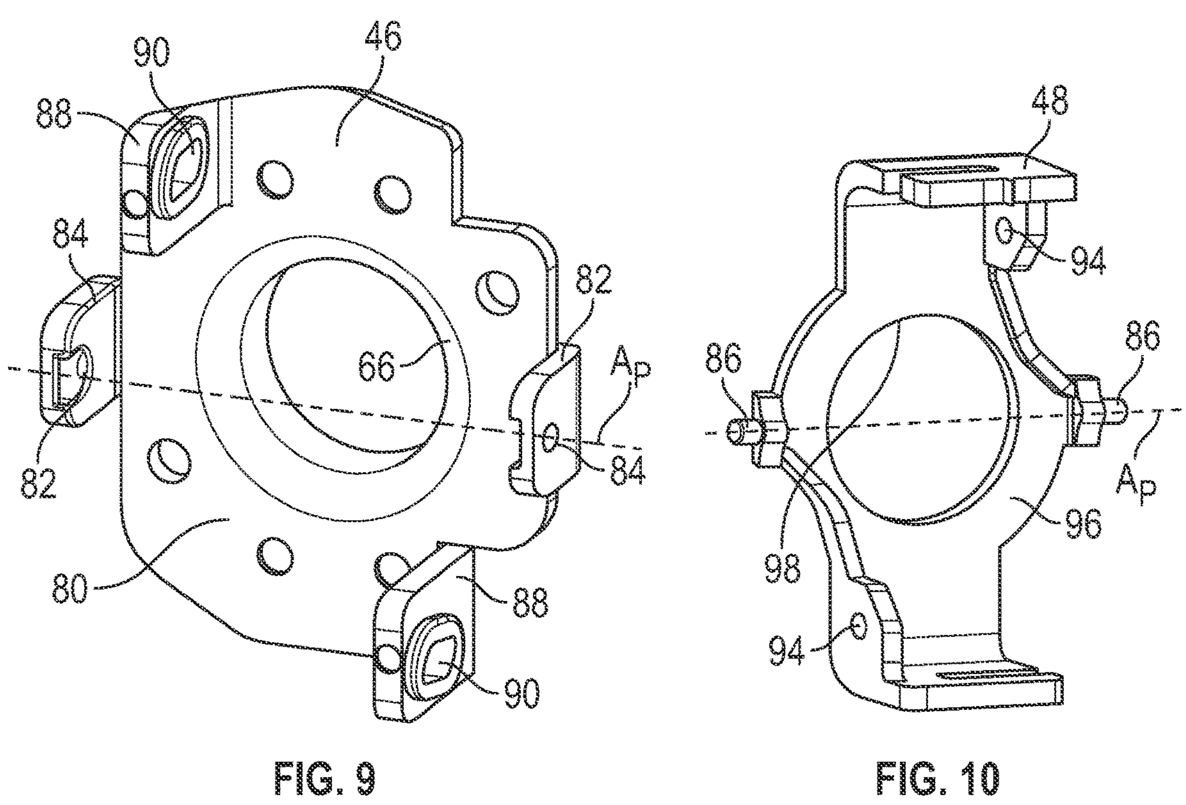
FIG. 9
FIG. 10

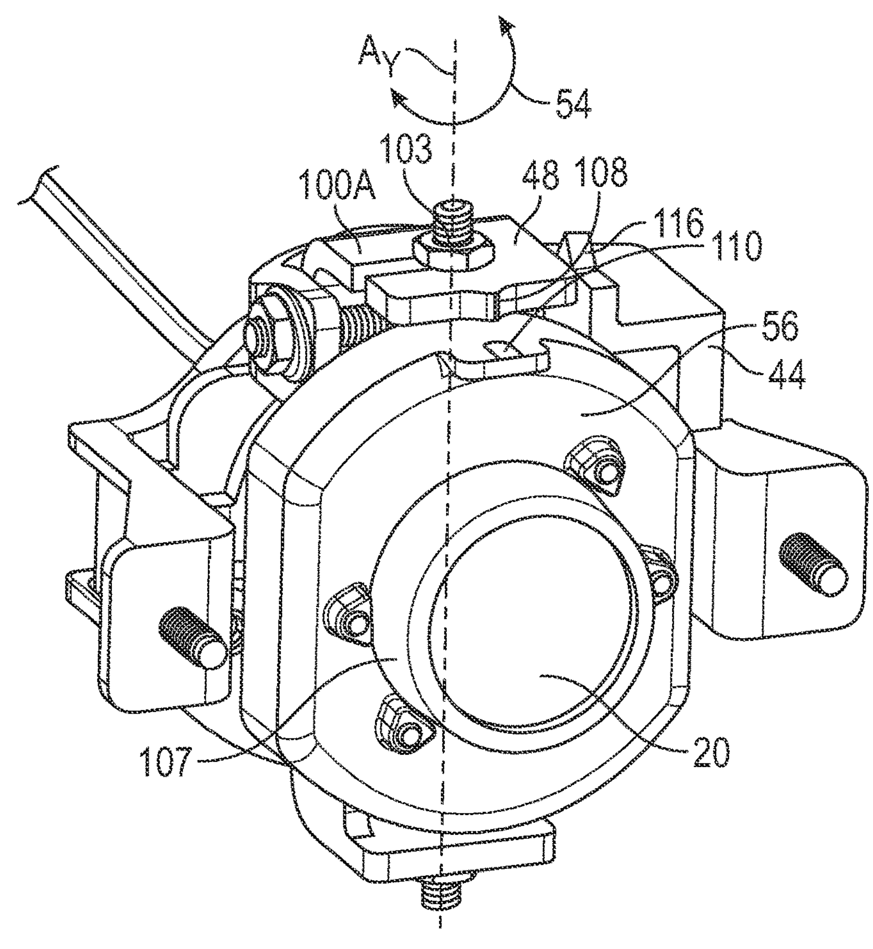
FIG. 11
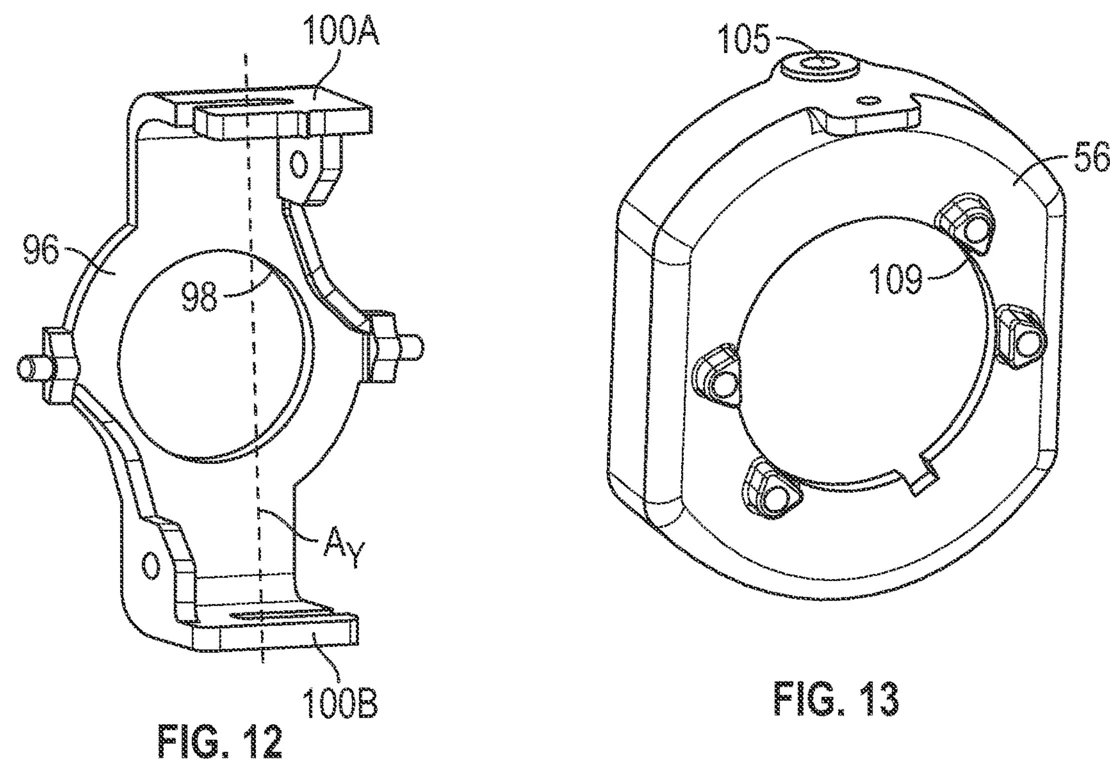
FIG. 12
FIG. 13

BRACKET ASSEMBLY FOR VEHICLE CAMERA MONITOR SYSTEMS

BACKGROUND

Mirror replacement systems, and camera systems for supplementing mirror views, are utilized in commercial vehicles to enhance the ability of a vehicle operator to see a surrounding environment. Camera monitor systems (CMS) utilize one or more cameras disposed about the vehicle to provide an enhanced field of view to a vehicle operator on one or more displays located in the vehicle cabin. In some examples, mirror replacement systems within the CMS can cover a larger field of view than a conventional mirror, or can include views that are not fully obtainable via a conventional mirror.

The cameras are installed in a fixed position to provide desired fields of view, for example, legally prescribed views according to regulation. Camera position is calibrated and set upon installation of the camera arm or wing onto the vehicle. Camera positioning between different vehicles may need to be different due to the installed position of the camera wing. Each camera's field of view may also change may change during vehicle operation due to the camera wing being bumped or the vehicle becoming damaged.

SUMMARY

In some aspects, the embodiments described herein relate to a camera monitor system (CMS) for a vehicle, including: a wing including a housing configured to be secured to the vehicle, and a camera assembly having a camera mounted to the wing with a bracket assembly. The camera may include an image capture unit configured to provide a desired field of view of the vehicle. A display may depict at least a portion of the field of view. A controller may be in communication with the camera and the display. The bracket assembly may include first, second, and third brackets configured for adjustment of the camera with respect to first, second, and third dimensions.

In a further example of the foregoing, the first, second, and third brackets are positioned in a nested configuration, the camera is mounted to the third bracket, and the first bracket operatively mounted to the housing.

In a further example of any of the foregoing, the first, second, and third brackets are connected serially, the second bracket interconnected between the first and third brackets.

In a further example of any of the foregoing, the first bracket is adjustably supported with first fasteners by a base for movement in first dimension, the base affixed to the housing.

In a further example of any of the foregoing, the second bracket is adjustably supported with second fasteners by the first bracket for movement in the second dimension.

In a further example of any of the foregoing, the third bracket is adjustably supported with third fasteners by the second bracket for pivoting in the third dimension.

In a further example of any of the foregoing, the first dimension is roll, the second dimension is pitch, and the third dimension is yaw.

In a further example of any of the foregoing, the first bracket is adjustably supported with first fasteners by a base for movement in first dimension, and each of the base, the first bracket, and the second bracket includes an opening for wiring of the camera to extend through.

In a further example of any of the foregoing, one of the base, the first bracket, the second bracket, and the third bracket includes a dial, and an adjacent one of the one of the base, the first bracket, the second bracket, and the third bracket to the one of the base, the first bracket, the second bracket, and the third bracket includes an indicator next to the dial, a relative position of the indicator to the dial being indicative of a position in a corresponding camera dimension provided by the one the first bracket, the second bracket, and the third bracket.

In a further example of any of the foregoing, the first bracket includes the dial, and the base includes the indicator positioned to indicate a position of the camera in the first dimension.

A method of adjusting a camera monitor system in a vehicle, the method may include adjusting a position of a camera disposed in a wing including a housing configured to be secured to the vehicle. The adjusting may include moving a first bracket relative to a base to a desired position in a first dimension, moving a second bracket relative to the first bracket to a desired position in a second dimension, and moving a third bracket relative to the second bracket to a desired position in a third dimension, the camera mounted to the third bracket.

In a further example of any of the foregoing, the first dimension is roll, the second dimension is pitch, and the third dimension is yaw.

In a further example of any of the foregoing, the method includes determining a change in vehicle position in at least one of a yaw, pitch, and roll directions, wherein the adjusting is based on the determined change.

In a further example of any of the foregoing, after the adjusting, the cover is secured to the wing.

In a further example of any of the foregoing, the method includes, before the adjusting step, removing a portion of the wing to access at least one of the base, the first bracket, the second bracket, and the third bracket.

In a further example of any of the foregoing, the method includes, before the adjusting step, unlocking at least one of the base, the first bracket, the second bracket, and the third bracket.

In a further example of any of the foregoing, the unlocking step includes loosening at least one fastener.

In a further example of any of the foregoing, the method includes locking the first bracket in position with a fastener.

In some aspects, the techniques described herein relate to a method, wherein the first bracket, the second bracket, and the third bracket are connected serially and positioned in a nested configuration, with the second bracket interconnected between the first and third brackets.

In a further example of any of the foregoing, the first dimension is roll, the second dimension is pitch, and the third dimension is yaw, and the method includes determining a change in vehicle position in at least one of a yaw, pitch, and roll directions, wherein the adjusting is based on the determined change.

These and other features may be best understood from the following specification and drawings, the following of which is a brief description.

BRIEF DESCRIPTION OF THE DRAWINGS

FIG. 8 schematically illustrates the adjustable engagement between the first bracket and second bracket in the pitch direction.

FIG. 9 illustrates the example first bracket.

FIG. 10 illustrates the example second bracket.

FIG. 11 schematically illustrates the adjustable engagement between the second bracket and third bracket in the yaw direction.

FIG. 12 illustrates an example second bracket.

FIG. 13 illustrates an example third bracket.

DETAILED DESCRIPTION

Figure 1A:
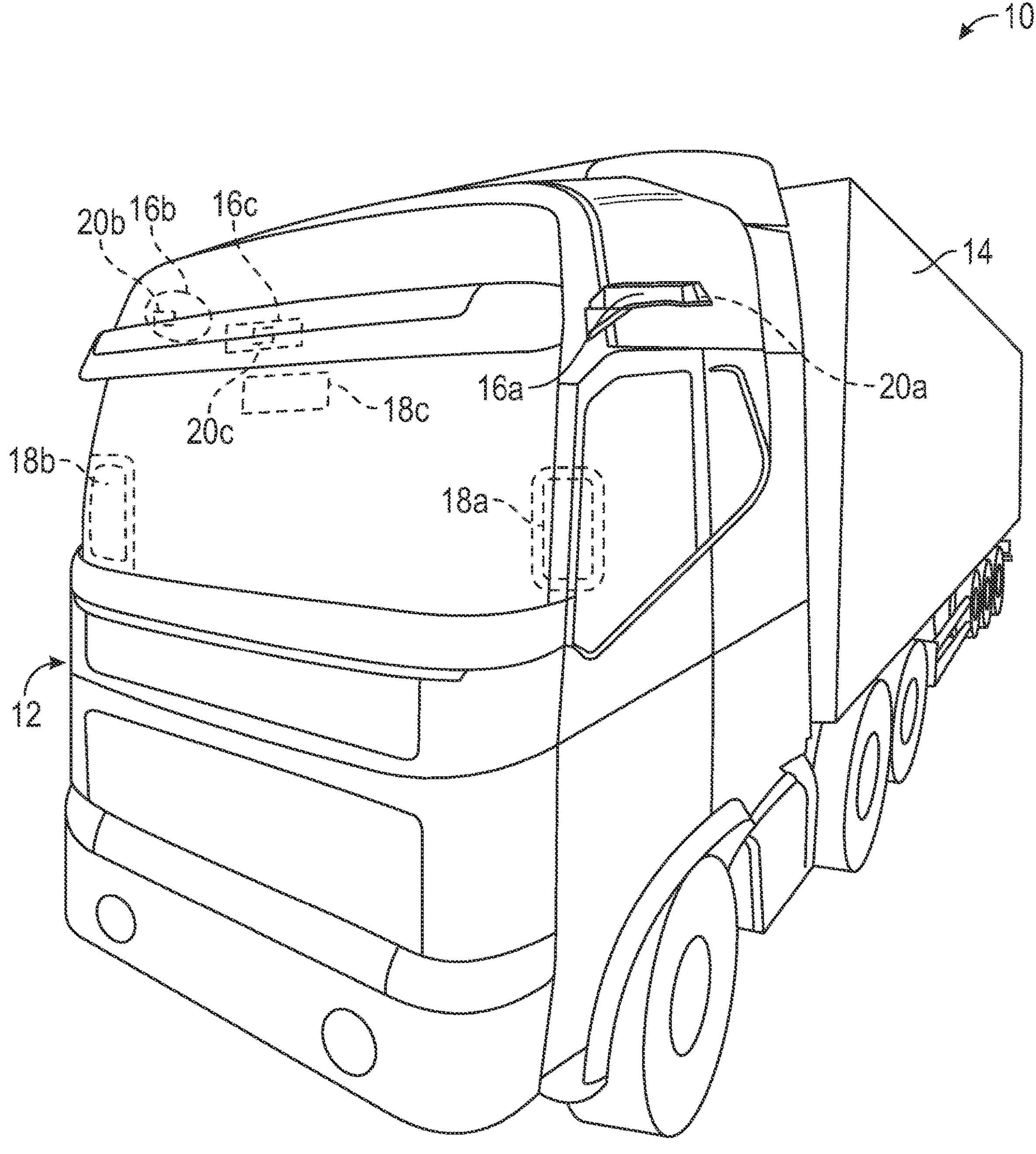
FIG. 1A is a schematic front view of a commercial truck with a camera monitor system (CMS) used to provide at least Class II and Class IV views.
Figure 1B:
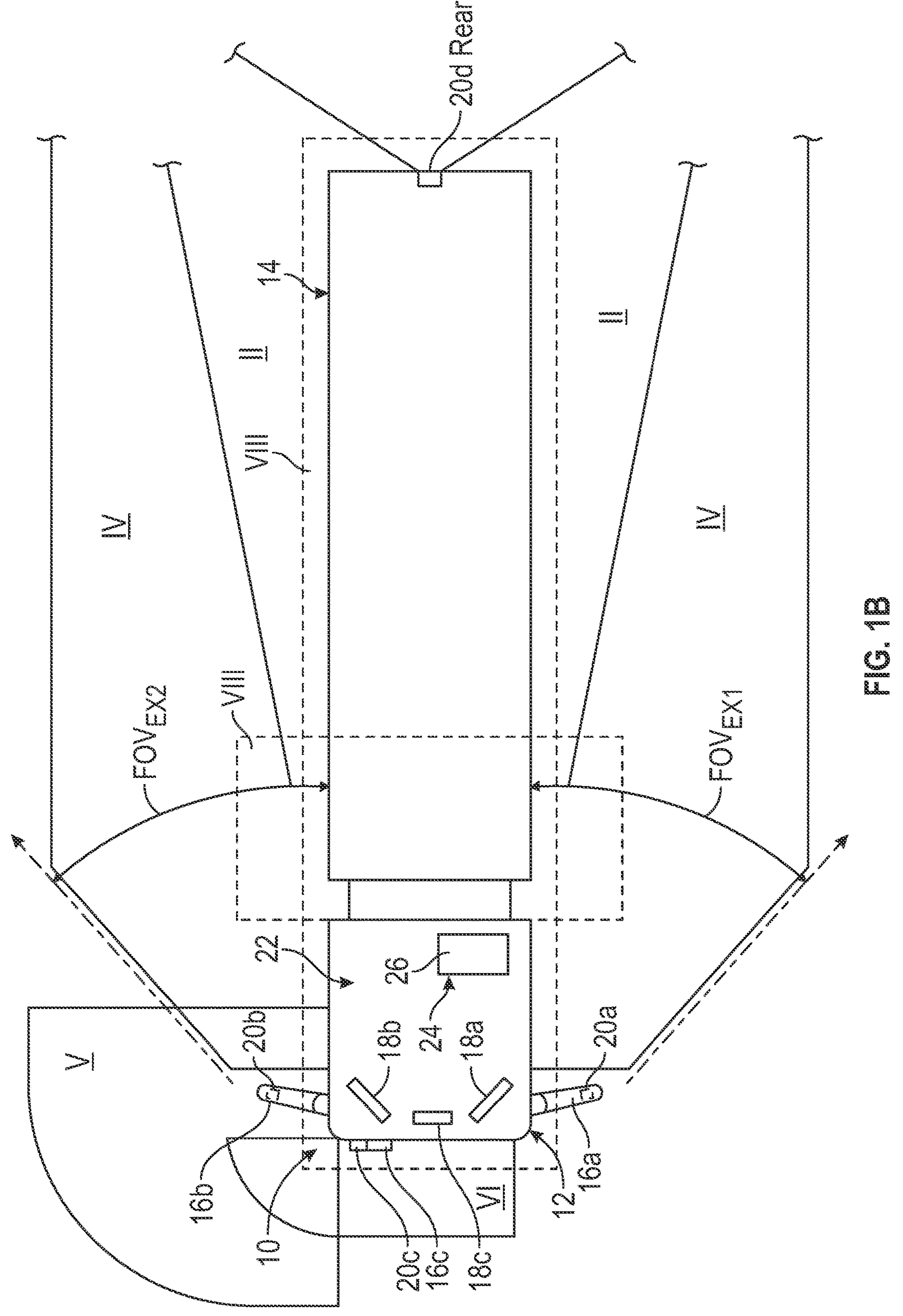
FIG. 1B is a schematic top elevational view of a commercial truck with a camera mirror system providing Class II, Class IV, Class V, Class VI and Class VIII views.
Figure 2:
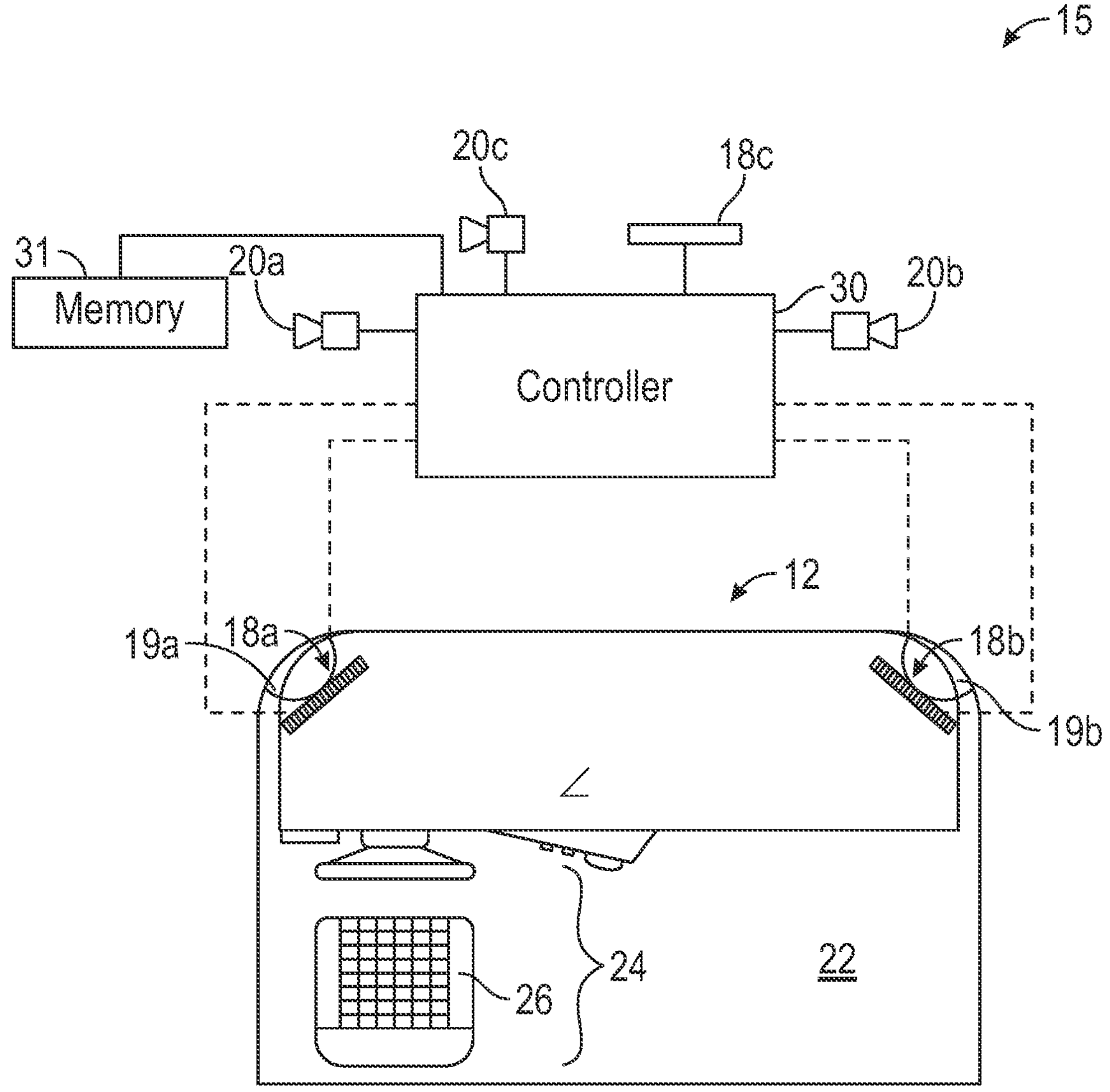
FIG. 2 is a schematic illustration of an interior of a vehicle cab and the CMS system.

A schematic view of a commercial vehicle 10 is illustrated in FIGS. 1A and 1B. FIG. 2 is a schematic top perspective view of the vehicle 10 cabin including displays and interior cameras. The vehicle 10 includes a vehicle cab or tractor 12 for pulling a trailer 14. It should be understood that the vehicle cab 12 and/or trailer 14 may be any configuration. Although a commercial truck is contemplated in this disclosure, the invention may also be applied to other types of vehicles. The vehicle 10 incorporates a camera monitor system (CMS) 15 (FIG. 2) that has driver and passenger side camera arms 16*a*, 16*b* (generally, "camera arm 16" or "wing") mounted to the outside of the vehicle cab 12. If desired, the camera arms 16*a*, 16*b* may include conventional mirrors integrated with them as well, although the CMS 15 can be used to entirely replace mirrors. In additional examples, each side can include multiple camera arms, each arm housing one or more cameras and/or mirrors.

Each of the camera arms 16*a*, 16*b* includes a base that is secured to, for example, the cab 12. A pivoting arm is supported by the base and may articulate relative thereto. Fixed wings may also be used. At least one rearward facing camera 20*a*, 20*b* is arranged respectively within camera arms. The exterior cameras 20*a*, 20*b* each have an image capture unit that capture an exterior field of view FOVEX1, FOVEX2 that each include at least one of the Class II and Class IV views (FIG. 1B), which are legal prescribed views in the commercial trucking industry. It is desirable to capture at least a portion of the trailer 14 in the field of view, for example, the side and/or end of the trailer, throughout vehicle operation. Multiple cameras also may be used in each camera arm 16*a*, 16*b* to provide these views, if desired. Class II and Class IV views are defined in European R46 legislation, for example, and the United States and other countries have similar drive visibility requirements for commercial trucks, for example, SAE J3155. Any reference to a "Class" view is not intended to be limiting, but is intended as exemplary for the type of view provided to a display by a particular camera. Each arm 16*a*, 16*b* may also provide a housing that encloses electronics that are configured to provide various features of the CMS 15.

First and second video displays 18*a*, 18*b* are arranged on each of the driver and passenger sides within the vehicle cab 12 on or near the A-pillars 19*a*, 19*b* to display Class II (narrow angle view) and Class IV (wide angle view) views (e.g., Class II depicted above Class IV in a portrait-style configuration) on its respective side of the vehicle 10, which provide rear facing side views along the vehicle 10 (e.g., portions of the trailer) that are captured by the exterior cameras 20*a*, 20*b*.

If video of Class V and/or Class VI views are also desired, a camera housing 16*c* and camera 20*c* may be arranged at or near the front of the vehicle 10 to provide those views (FIG. 1B). A third display 18*c* arranged within the cab 12 near the top center of the windshield can be used to display the Class V and Class VI views, which are toward the front of the vehicle 10, to the driver. The displays 18*a*, 18*b*, 18*c* face a driver region 24 within the cabin 22 where an operator is seated on a driver seat 26. The location, size and field(s) of view streamed to any particular display may vary from the configurations described in this disclosure and still incorporate the disclosed invention.

If video of Class VIII views is desired, camera housings can be disposed at the sides and rear of the vehicle 10 to provide fields of view including some or all of the Class VIII zones of the vehicle 10. As illustrated, the Class VIII view includes views immediately surrounding the trailer, and in the rear proximity of the vehicle including the rear of the trailer. In one example, a view of the rear proximity of the vehicle is generated by a rear facing camera disposed at the rear of the vehicle, and can include both the immediate rear proximity and a traditional rear view (e.g. a view extending rearward to the horizon, as may be generated by a rear view mirror in vehicles without a trailer). In such examples, the third display 18*c* can include one or more frames displaying the Class VIII views. Alternatively, additional displays can be added near the first, second and third displays 18*a*, 18*b*, 18*c* (generally, "display 18") and provide a display dedicated to providing a Class VIII view.

In some cases, the Class VIII view is generated using a trailer mounted camera 30. The trailer mounted camera 20*d* is a rear facing camera which provides a field of view behind the trailer. This rear view can be provided to one of the displays 18*a*, 18*b* and/or another display 18*c* within the vehicle cabin 22 as a rear view mirror replacement or as a rear view mirror supplement. This view is particularly beneficial as the trailer 14 may block some, or all, views provided by a conventional rear view mirror.

The CMS 15 is also configured to utilize the images from the cameras 20*a*, 20*b*, 20*c*, 20*d* (generally, "camera 20") as well as images from other cameras that may be disposed about the vehicle or in communication with the vehicle to determine features of the vehicle, identify objects, and facilitate driver assistance features such as display overlays and semi-automated driver assistance systems.

These features and functions of the CMS 15 are used to implement multiple CMS 15 systems that aid in operation of the vehicle. It should be noted that a controller 30 (FIG. 2) for the CMS 15 can be used to implement the various functionalities disclosed in this application. The controller 30, which is in communication with the displays 18 and cameras 20, may include one or more discrete units. For example, a centralized architecture may have a common controller arranged in the vehicle 10, while a decentralized architecture may use a controller provided in each of the displays 18, for example. Moreover, a portion of the controller 30 may be provided in the vehicle 10, while another portion of the controller 30 may be located elsewhere, for example, the camera arms 16. In another example, a master-slave display configuration may be used where one display includes the controller 30 while the other display receives the commands from the controller 30.

In terms of hardware architecture, such a controller can include a processor, memory (e.g., memory 31, FIG. 2), and one or more input and/or output (I/O) device interface(s) that are communicatively coupled via a local interface. The local interface can include, for example but not limited to, one or more buses and/or other wired or wireless connections. The local interface may have additional elements, which are omitted for simplicity, such as controllers, buffers (caches), drivers, repeaters, and receivers to enable communications. Further, the local interface may include address, control, and/or data connections to enable appropriate communications among the aforementioned components.

The controller 30 may be a hardware device for executing software, particularly software stored in memory (e.g., memory 31, FIG. 2). The controller 30 can be a custom made or commercially available processor, a central processing unit (CPU), an auxiliary processor among several processors associated with the controller, a semiconductor-based microprocessor (in the form of a microchip or chip set) or generally any device for executing software instructions.

The memory 31 can include any one or combination of volatile memory elements (e.g., random access memory (RAM, such as DRAM, SRAM, SDRAM, VRAM, etc.)) and/or nonvolatile memory elements (e.g., ROM, hard drive, tape, CD-ROM, etc.). Moreover, the memory 31 may incorporate electronic, magnetic, optical, and/or other types of storage media. The memory 31 can also have a distributed architecture, where various components are situated remotely from one another, but can be accessed by the processor.

The software in the memory 31 may include one or more separate programs, each of which includes an ordered listing of executable instructions for implementing logical functions. A system component embodied as software may also be construed as a source program, executable program (object code), script, or any other entity comprising a set of instructions to be performed. When constructed as a source program, the program is translated via a compiler, assembler, interpreter, or the like, which may or may not be included within the memory 31.

The disclosed input and output devices that may be coupled to system I/O interface(s) may include input devices, for example but not limited to, a keyboard, mouse, scanner, microphone, camera, mobile device, proximity device, etc. Further, the output devices, for example but not limited to, a printer, display, etc. Finally, the input and output devices may further include devices that communicate both as inputs and outputs, for instance but not limited to, a modulator/demodulator (modem; for accessing another device, system, or network), a radio frequency (RF) or other transceiver, a telephonic interface, a bridge, a router, etc.

When the controller 30 is in operation, the processor can be configured to execute software stored within the memory 31, to communicate data to and from the memory 31, and to generally control operations of the computing device pursuant to the software. Software in memory 31, in whole or in part, is read by the processor, perhaps buffered within the processor, and then executed.

Figure 3:
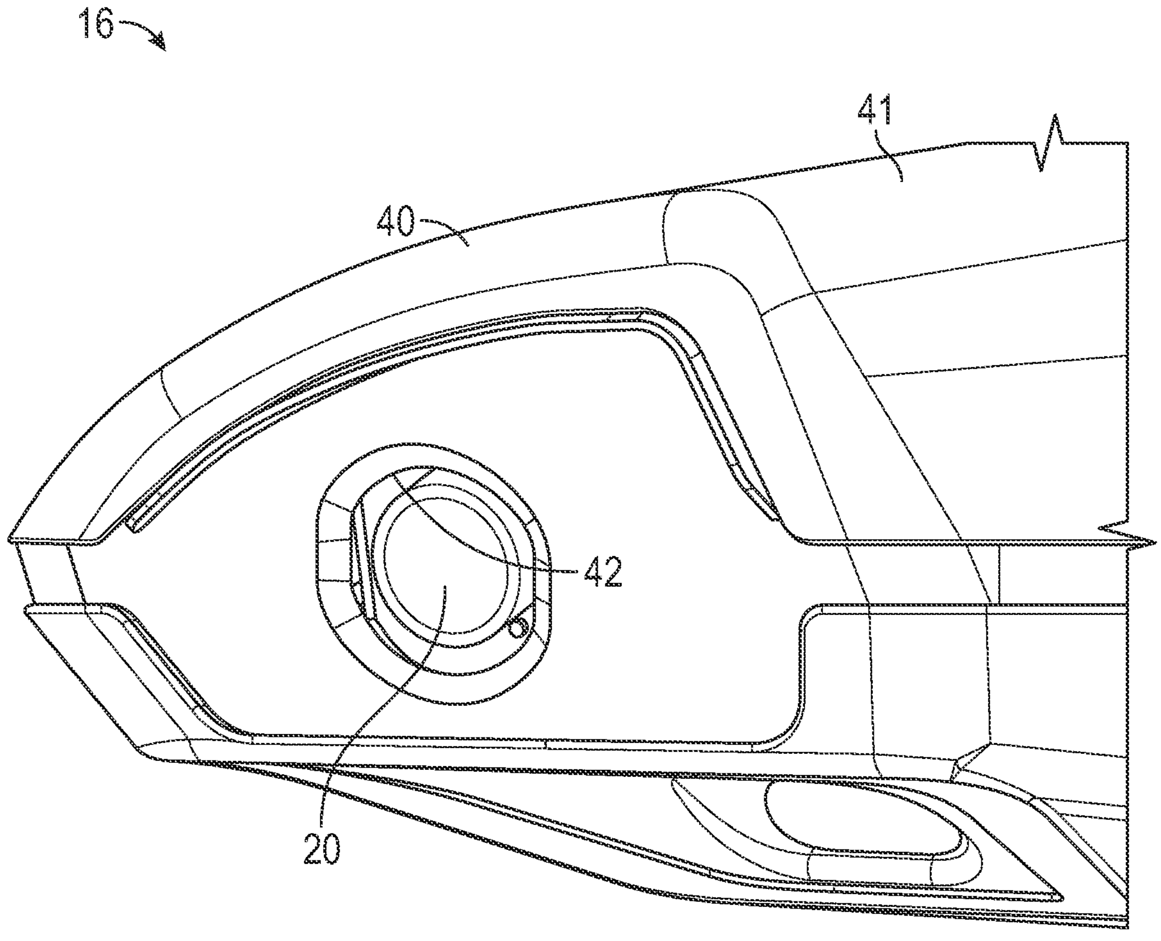
FIG. 3 illustrates an example wing.

FIG. 3 illustrates an example wing 16 of the example CMS 15. A camera assembly is mounted to the wing 16 through an adjustable bracket assembly 38 (not shown; see later Figures) and includes a camera 20 with an image capture unit configured to provide a desired field of view of the vehicle to which the wing 16 is attached. As shown, the example wing 16 includes a housing 40 secured to the vehicle and providing an opening 42 through which the camera 20 can capture one or more images. Although a camera 20 is the object adjustable by the example bracket assemblies and method disclosed herein, other objects, including other vehicle sensors, may benefit from this disclosure.

Applicant has identified that it may be desirable to adjust objects such as vehicle cameras 20 in various dimensions such as for calibration, precision, or to compensate for vehicle position changes. The systems and methods disclosed herein may benefit non-vehicular applications as well.

Figure 4:
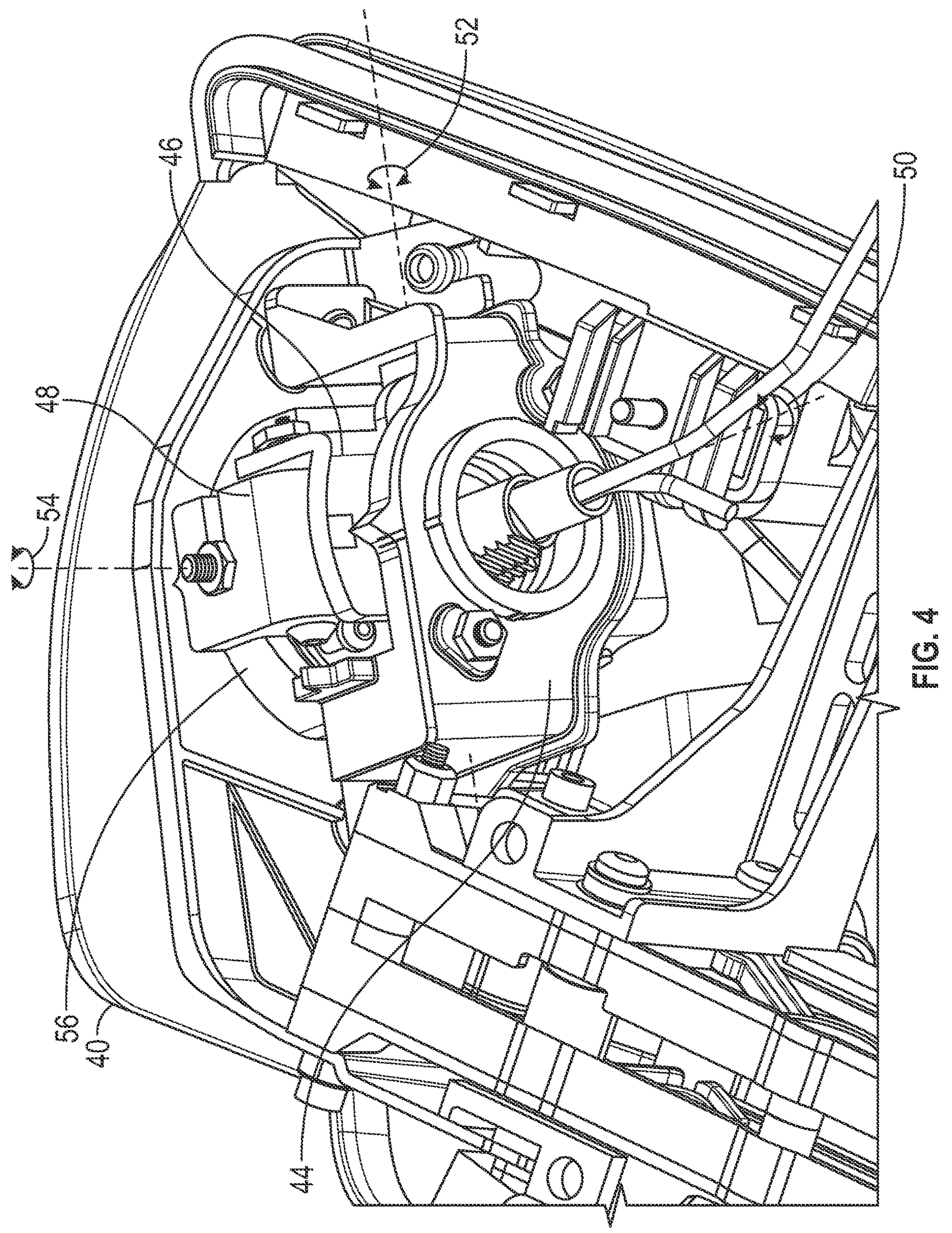
FIG. 4 illustrates an interior view of the example wing of FIG. 3.
Figure 18:
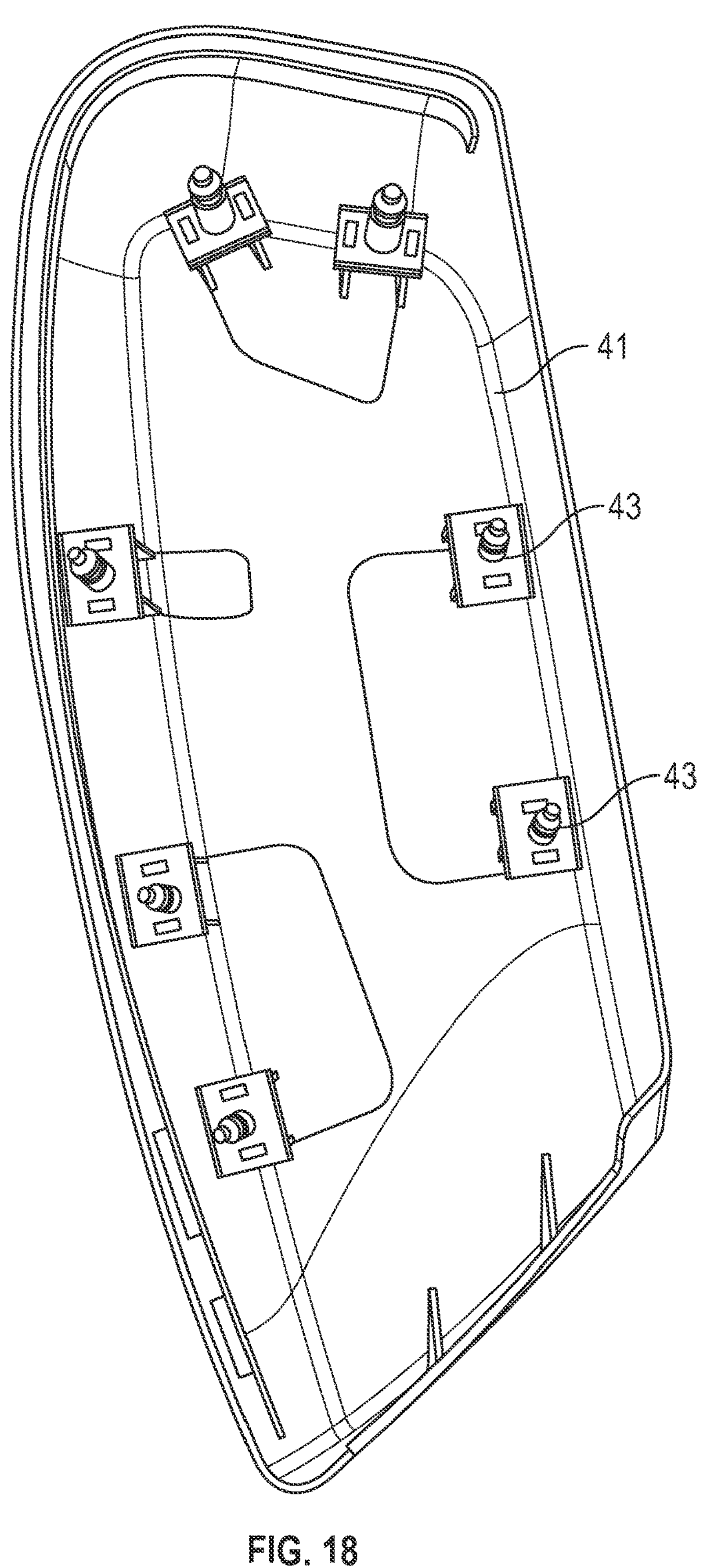
FIG. 18 illustrates an example cover portion for an example wing.

FIG. 4 illustrates the interior of the example wing 16 of FIG. 3, including the example bracket assembly 38 internal to the housing 40 and including a base 44, a first bracket 46, a second bracket 48, and a third bracket 56 for pivotable adjustment of the camera 20 with respect to three dimensions. In some implementations, the adjustment of the various components in the bracket assembly 38 described herein may be pivotable adjustment. A cover portion 41 (see FIG. 3) of the housing 40 may be removed to access the bracket assembly 38. In some examples, the cover portion 41 is installed in a sealed manner and/or removed by one or more snap-fit connection points 43 (FIG. 18). In some disclosed examples the three dimensions are the yaw, pitch, and roll dimensions. The base 44 may be affixed to the housing 40. The bracket assembly 38 may be formed of plastic. The bracket assembly 38 may be formed of thermoplastic. The bracket assembly 38 may be formed of Polycarbonate-acrylonitrile butadiene styrene (PC-ABS).

As will be explained further, the example first bracket 46 is adjustably supported with the base 44 for movement in the roll dimension 50. The example second bracket 48 is adjustably supported with the first bracket 46 for movement in the pitch dimension 52. The example third bracket 56 is adjustably supported with the second bracket 48 for movement in the yaw dimension 54, and the camera 20 (See FIG. 11) is mounted to the third bracket 56. The third bracket 56 may be integral with the camera 20 or be a separate component in some examples.

In some examples, as shown, the base 44, first bracket 46, second bracket 48, and third bracket 56 are positioned in a nested configuration. The example first bracket 46 is nested within the base 44, and the example second bracket 48 is nested within the first bracket 46, and the example third bracket 56 is nested within the second bracket 48. In some examples, as shown, the base 44, first bracket 46, second bracket 48, and third bracket 56 may be connected serially. The second bracket 48 may be interconnected between the first bracket 46 and the third bracket 56.

Figure 5A:
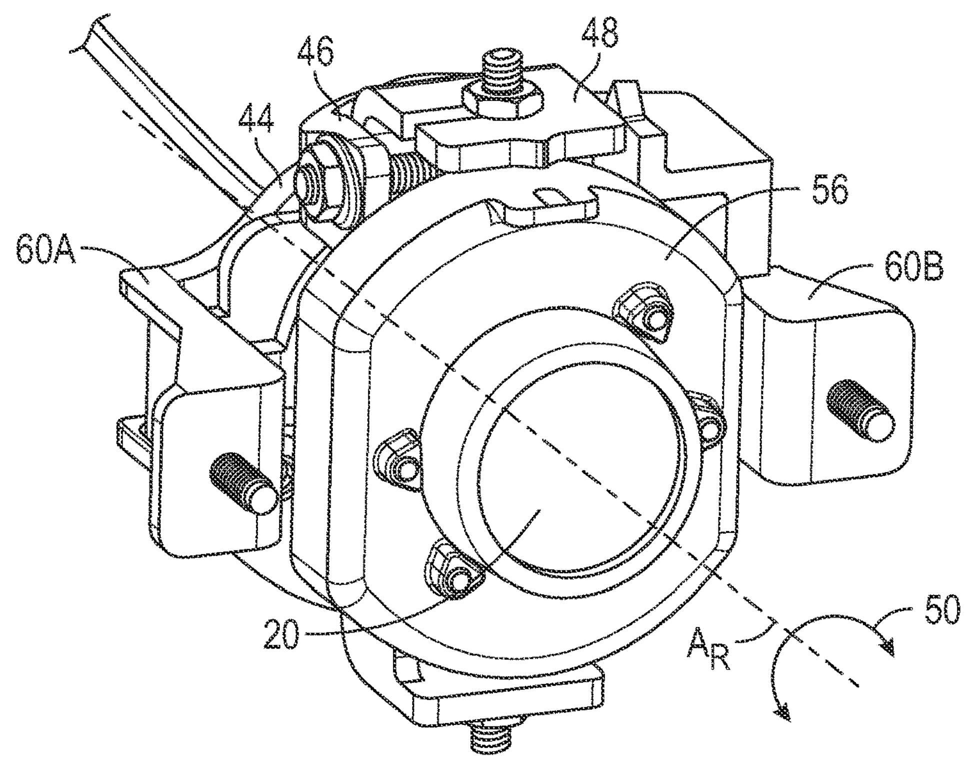
FIG. 5A schematically illustrates the adjustable engagement between the base and first bracket in the roll direction.
Figure 5B:
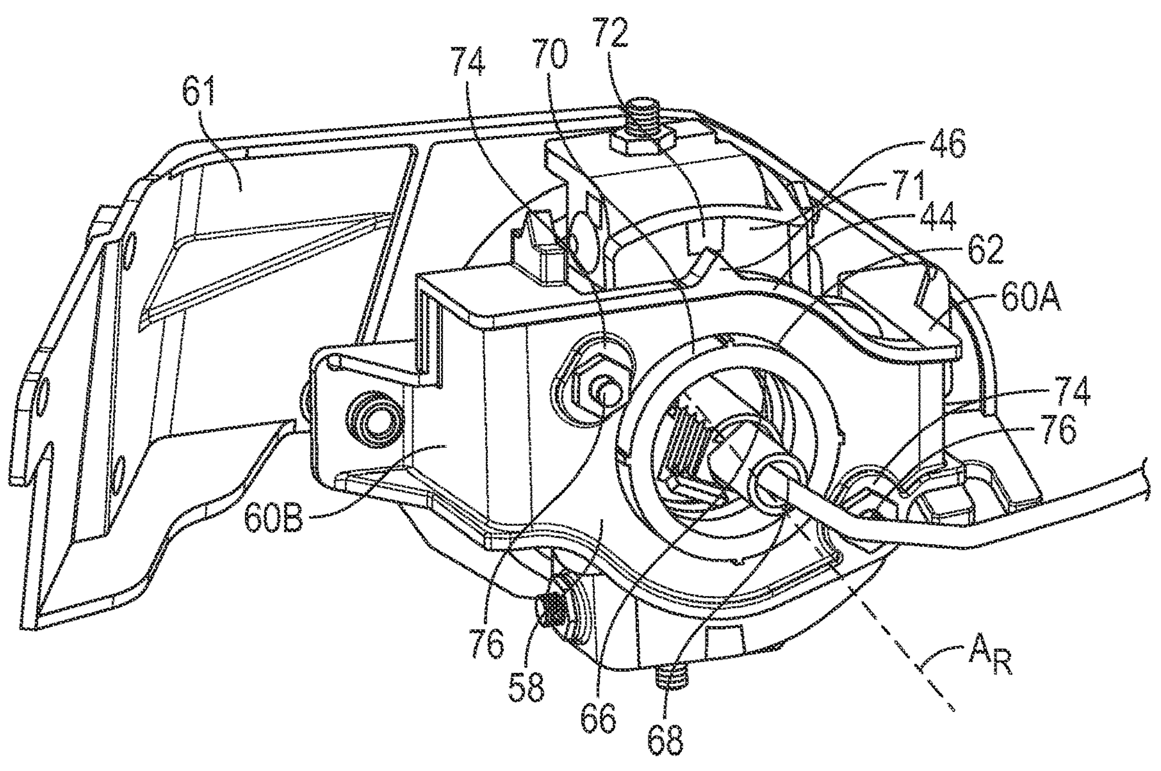
FIG. 5B illustrates another view of the example bracket assembly.

FIGS. 5A and 5B illustrate the adjustable engagement between the base 44 and the first bracket 46 in the roll direction 50. The example base 44 includes a main body portion 58 and arms 60A and 60B extending from the main body portion 58. The base 44 is fixed to a support bracket 61 at the arms 60A and 60B. The example second bracket 48 and third bracket 56 are nested between the arms 60A and 60B.

The main body portion 58 includes an opening 62, and the first bracket 46 has a ring protrusion 64 that extends through, and is adjustable within, the opening 62 and circumscribes an opening 66. Wiring 68 from the camera 20 may extend through the openings 62, 66. In the example, the roll axis AR extends through the openings 62, 66. In some examples, as shown, the roll axis AR is centered within the openings 62, 66. In some examples, as shown, the openings 62, 66 are circular.

A roll indicator 71 may be provided on the main body portion 58 and positioned to indicate the roll position of the camera 20 on a roll dial 72 provided on the first bracket 46. An example indicator 71 may be next to dial 72, such as shown and described in more detail at FIG. 15.

As the example base 44 is fixed to the support bracket 61 and the support bracket 61 is fixed within the housing 40, the first bracket 46 is adjustable relative to the base 44 about the roll dimension to adjust the roll position of the camera 20. When the first bracket 46 is adjusted in the roll dimension 50, the second bracket 48, third bracket 56, and camera 20 move with the first bracket 46 such that the camera 20 roll position is adjusted.

The main body portion 58 may provide one or more slots 74 for receiving one or more fasteners 76 coupled to the first bracket 46 for adjustable support to secure the first bracket 46 at a desired roll position. In some examples, the one or more slots 74 may be sized and positioned to allow the fasteners 76 to move circumferentially within the slots 74 relative to the roll axis AR when the first bracket 46 is adjusted in the roll dimension 50 before being tightened at the desired roll position. In some examples, as shown, the slot 74 may be oblong with respect to its circumferential length. The example fasteners 76 may be bolts or screws in some examples, but a skilled person having the benefit of this disclosure would recognize that other fastener types may be utilized. The various fasteners disclosed herein may be loosened before adjustment and tightened after adjustment to secure the bracket assembly 38 in a desired position. The slots 74 may be positioned opposite the opening 62 from one another. Although two slots 74 are shown in the illustrative example, more or fewer slots may be utilized in some examples.

Figure 6:
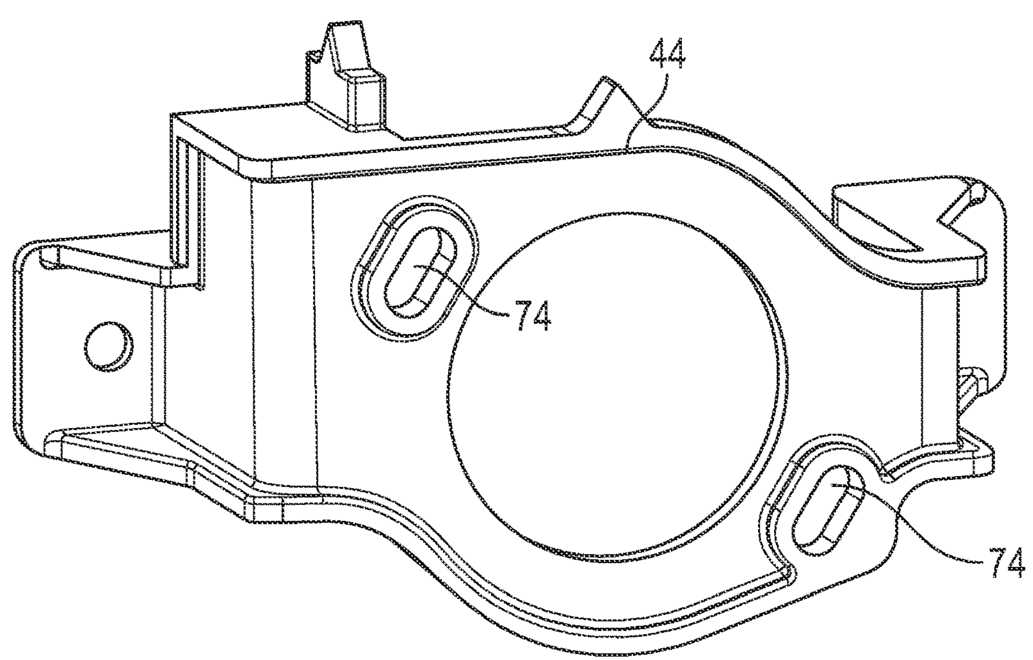
FIG. 6 illustrates an example base.
Figure 7:
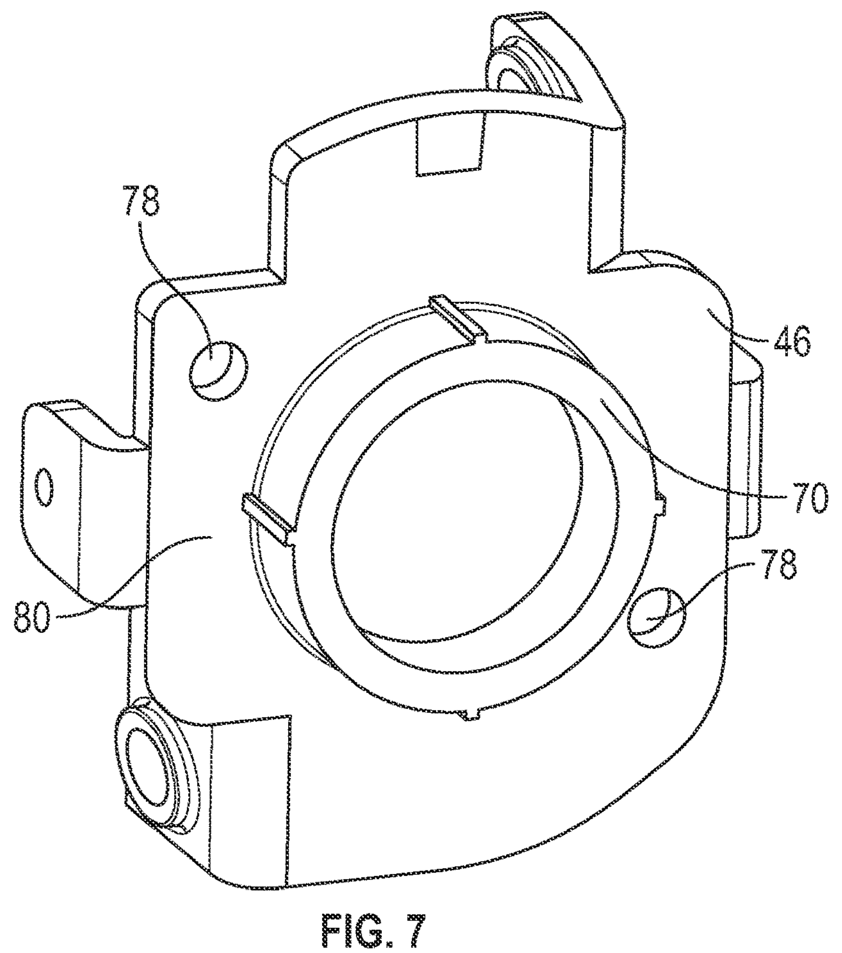
FIG. 7 illustrates an example first bracket.

FIGS. 6 and 7 illustrate the example base 44 and first bracket 46, respectively. The first bracket 46 includes one or more fastener openings 78 that are smaller than the slots 74. The fastener openings 78 may be sized such that the fasteners 76 (not shown) may not move circumferentially within the fastener opening 78. That is, when fasteners 76 are received within the slots 74 and fastener openings 78 but not yet tightened, the fasteners 76 can move circumferentially within the slots 74 but not the fastener openings 78.

As illustrated schematically in FIG. 8, the second bracket 48 is adjustable in the pitch dimension 52 relative to the first bracket 46. As such, the second bracket 48 may be adjusted in the pitch dimension 52, with the third bracket 56 and the camera 20 moving therewith for adjustment of the camera 20 to a desired pitch position.

With continued reference to FIG. 8, FIGS. 9 and 10 illustrate the first bracket 46 and second bracket 48, respectively. The first bracket 46 includes a main plate 80 and two wings 82 extending from the main plate 80. The wings 82 may extend from opposite lateral ends of the main plate 80. The wings 82 may be substantially perpendicular (±10 degrees) to the main plate 80. The wings 82 provide apertures 84 for receiving posts 86 of the second bracket 48. The posts 86 are centered on the pitch axis AP, which extends through the apertures 84. The posts 86 are adjustable within the apertures 84 for adjusting of the second bracket 48 in the pitch dimension 52.

One or more walls 88 may extend from the main plate 80, providing a slot 90 for receiving a fastener 92 for adjustable support for securing the second bracket 48 in the desired pitch position. The example slots 90 may be oblong and may be larger than openings 94 in the second bracket 48 that also receive the fasteners 92. The slots 90 allow the fasteners 92 to move in the circumferential direction relative to the pitch axis AP within the slots 90 during pitch adjustment and before tightening of the fasteners 92. The walls 88 may be substantially perpendicular (±10 degrees) to the main plate 80. One wall 88 may extend from an upper portion of the main plate 80, and a second wall 88 may extend from a lower portion of the main plate 80 opposite the upper portion.

The example wings 82 and walls 88 may extend from the plate 80 in a first direction, and the ring protrusion 70 (see FIG. 7) may extend from the plate 80 in a second direction opposite the first direction. The example wings 82 are positioned between the arms 60A, 60B of the base 44. The example wings 82 are opposite the opening 66 from one another. The wings 82 and the walls 88 may be substantially parallel (±10 degrees) to one another in some examples. The wings 82 and the walls 88 adjoin the main plate 80.

The second bracket 48 includes a main body portion 96 providing an opening 98, which may be circular in some examples, and the posts 86 extend from the main body portion 96 and are opposite the opening 98 from one another. The example posts 86 extend from the main body portion 96 in opposite directions. The opening 98 may be aligned with the opening 66 when assembled. With reference to FIG. 5B, the camera wiring 68 may extend through the opening 98.

As illustrated schematically in FIG. 11, the third bracket 56 is adjustable in the yaw dimension 54 relative to the second bracket 48. As such, the third bracket 56 may be adjusted in the yaw dimension 54, with camera 20 being fixed to the third bracket 56 and moving therewith for adjustment of the camera 20 to a desired yaw position.

FIGS. 12 and 13 illustrate the second bracket 48 and the third bracket 56, respectively. An upper support wall 100A and a lower support wall 100B extend from the main body portion 96 of the second bracket 48. The upper support wall 100A and lower support wall 100B are opposite the opening 98 from one another. The yaw axis AY extends through the upper support wall 100A and lower support wall 100B. One or more fasteners 103 may be centered on the yaw axis AY and extend through one or both of the walls 100A, 100B. The upper support wall 100A and lower support wall 100B may be substantially parallel (±10 degrees) to one another.

The third bracket 56 may include one or more fastener openings 105 for receiving the fastener 103 for adjustable support, allowing the third bracket 56 to move relative to the fastener 103. The third bracket 56 includes a camera opening 109 for receiving the camera 20. The example opening 109 surrounds a lens portion 107 of the camera 20. Although one fastener opening 105 is shown near the upper end, an additional fastener opening 105 may be provided near the lower end additionally or alternatively. The third bracket 56 may be nested between the support walls 100A, 100B as shown.

Referring back to FIG. 11, a yaw indicator 111 may be provided on the upper support wall 100A for indicating yaw position on a yaw dial 113 provided on the third bracket 56.

Figure 14:
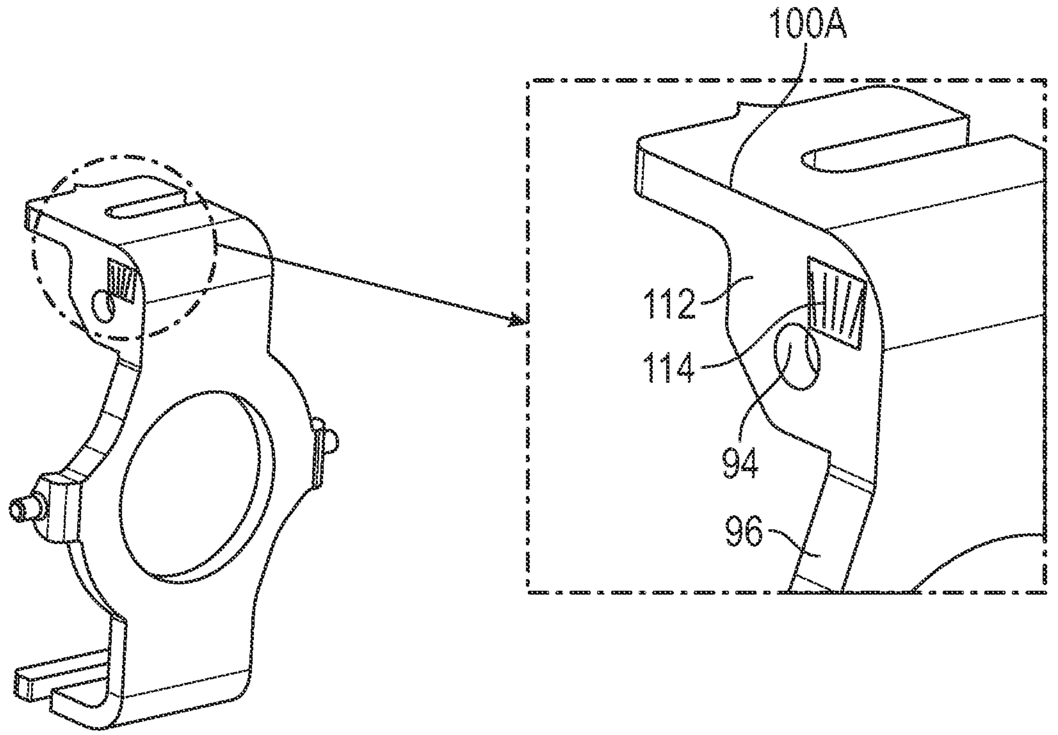
FIG. 14 illustrates another view of the example second bracket.

As illustrated in FIG. 14, a wall 112 adjoining the support wall 100A and the main body portion 96 may provide a pitch dial 114 for the pitch position of the bracket assembly. The wall 112 may provide a fastener opening 94. A pitch indicator 116 (see FIG. 11) may be provided on the base for indicating pitch position on the pitch dial 114.

Figure 15:
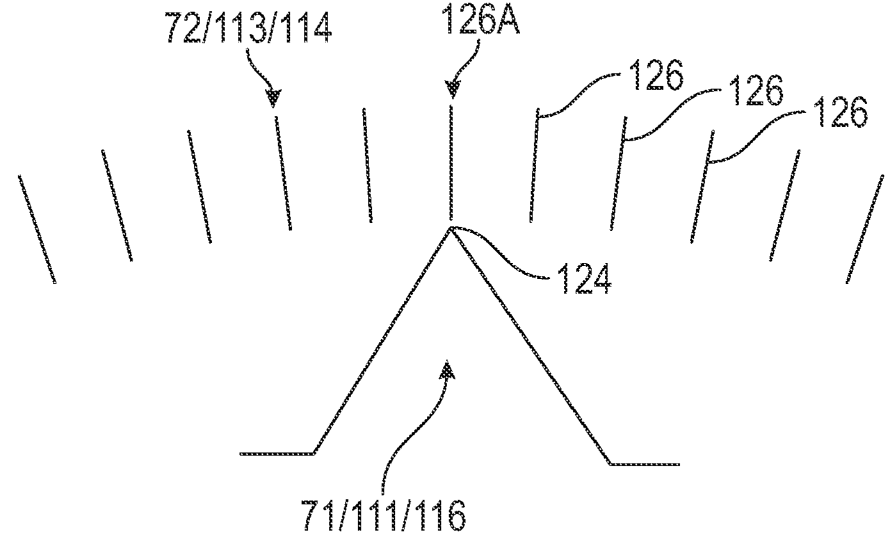
FIG. 15 illustrates an example indicator and dial.

FIG. 15 illustrates an example indicator 71/111/116 and dial 72/113/114. The indicator 71/111/116 may include a tip 124 positioned to indicate on markers 126 on the dial. In some examples, at initial setup of the bracket assembly 38, the tip 124 may be positioned at a center marker 126A. The center marker 126A may indicate a baseline position in the dimension. In some examples, adjacent markers 126 are spaced 1 degree from one another, and there are 5 markers on each side of the center marker 126A. More or fewer markers 126 may be utilized. Other spacing increments may be utilized as well. As the bracket assembly is adjusted in one of the three dimensions described herein, the associated indicator 71/111/116 will indicate the position in that dimension on the associated dial 72/113/114. In some examples, one may receive input that an adjustment in one or more of the dimensions is needed, and can make the adjustment with the use of the indicators 71/111/116 and dials 72/113/114 and without the need for additional measurement devices.

Figure 16:
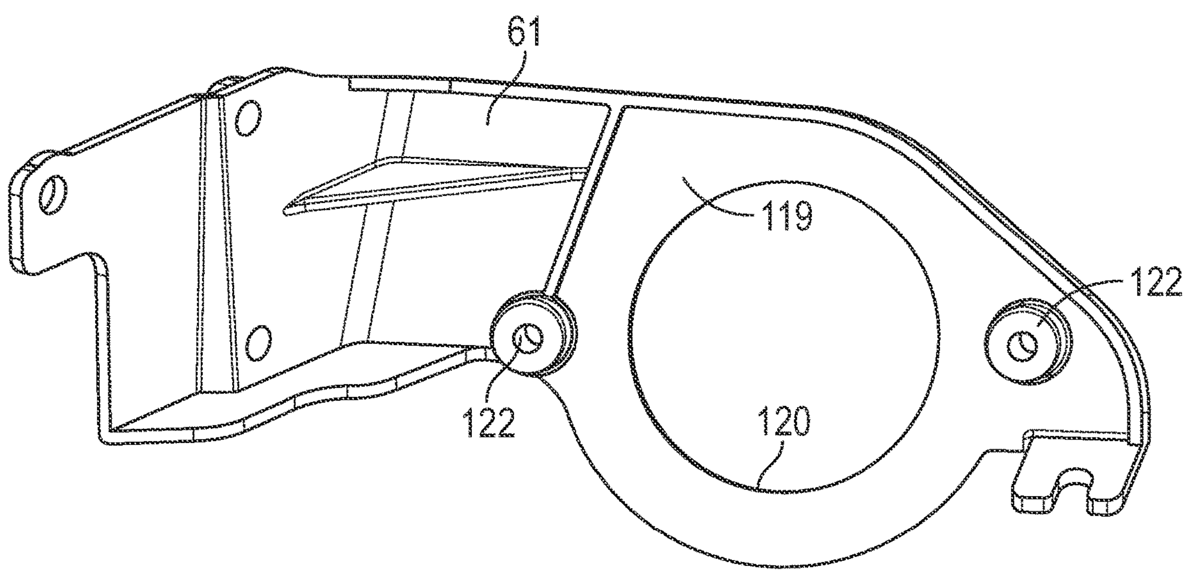
FIG. 16 illustrates an example support bracket.
Figure 17:
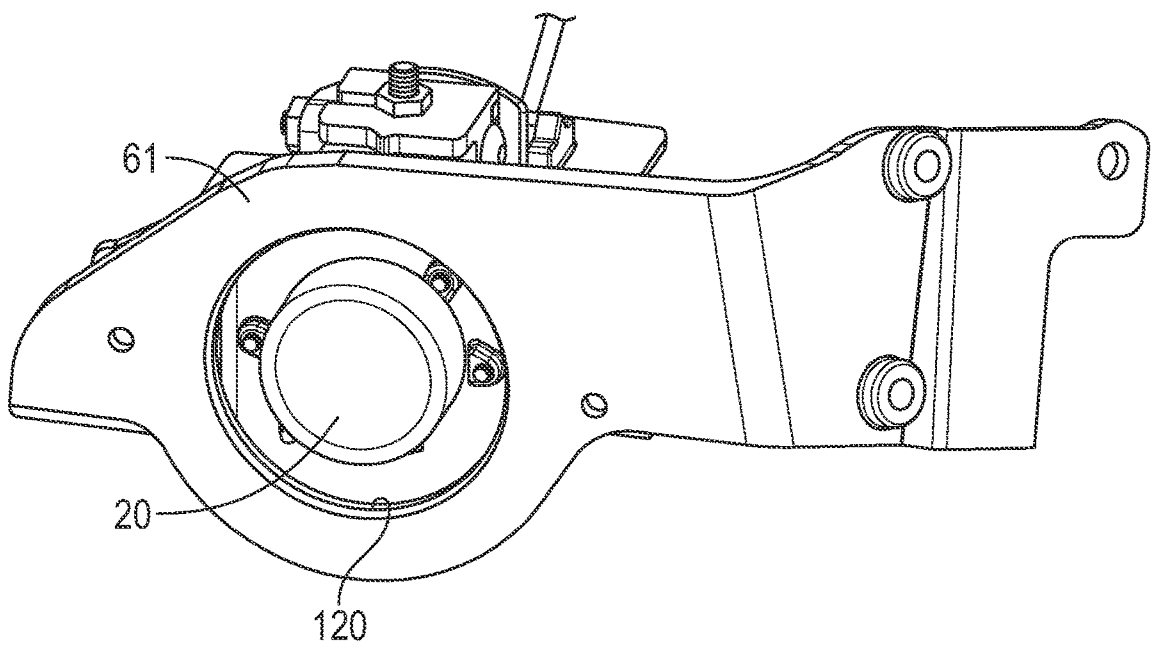
FIG. 17 illustrates another view of the example support bracket.

FIGS. 16 and 17 illustrate the example support bracket 61. The support bracket 61 includes a wall 119 that provides an opening 120 for the camera 20 to view through. Apertures 122 are provided on opposite sides of the opening 120, to which the arms 60A, 60B (see FIG. 5B) of the base 44 are fixed. Referring back to FIG. 5B, the second bracket 48, the main plate 80, and the third bracket 56 may be provided between the main body portion 58 and the wall 119.

A method of adjusting a camera monitor system 15 in a vehicle, according to the examples herein, may include adjusting a position of a camera 20 in a wing 16 secured to the vehicle. The adjusting may include moving a first bracket 46 relative to a base 44 to a desired position in a first dimension, moving a second bracket 48 relative to the first bracket 46 to a desired position in a second dimension, and moving a third bracket 56 relative to the second bracket 48 to a desired position in a third dimension, with the camera 20 mounted to the third bracket 56.

An example method may further include determining a change in vehicle position in at least one of a yaw, pitch, and roll directions, and the adjusting is based on the determined change. The change may be determined relative to a vehicle coordinate system, such as vehicle coordinate system ISO 8855 in some examples. One or both of the wing and the camera may have one or more differences from the vehicle reference, and adjustments may be made based on those differences.

After the adjusting, an example method may include securing a cover to the wing. In some examples, the securing is achieved by way of one or more snap-fit connection points.

Before the adjusting step, an example method may include removing a portion of the wing 16 to access at least one of the third bracket 56, the first bracket 46, and the second bracket 48. Before the adjusting step, an example method may include unlocking at least one of the third bracket 56, the first bracket 46, and the second bracket 48. The unlocking step includes loosening at least one fastener. An example method may include locking a bracket in position with a fastener.

The example assemblies and methods disclosed help position and also measure the extrinsic position with variation for a number of degrees in each of the rotational axes, to accommodate for cabin configurations, build tolerances and over life time changes on the wing or physical structure with slight modification in the wing as a service or build option. Additional measurement devices may not be needed. The position of the camera can be adjusted to accommodate such changes instead of having to replace the entire wing.

Although the different examples are illustrated as having specific components, the examples of this disclosure are not limited to those particular combinations. It is possible to use some of the components or features from any of the embodiments in combination with features or components from any of the other embodiments.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A camera monitor system (CMS) for a vehicle, comprising:
- a wing including a housing configured to be secured to the vehicle;
- a camera assembly having a camera mounted to the wing with a bracket assembly, the camera including an image capture unit configured to provide a desired field of view of the vehicle;
- a display configured to depict at least a portion of the field of view; and
- a controller in communication with the camera and the display;
- wherein the bracket assembly comprises first, second, and third brackets configured for adjustment of the camera with respect to first, second, and third dimensions, wherein the first bracket is adjustably secured to a base by a plurality of first fasteners so as to permit adjustment of the first bracket relative to the base along a first dimension, and each of the base, the first bracket, and the second bracket defines a respective opening for wiring of the camera to extend through.

2. The system of claim 1, wherein the first, second, and third brackets are positioned in a nested configuration, the camera mounted to the third bracket, and the first bracket operatively mounted to the housing.

3. The system of claim 2, wherein the first, second, and third brackets are connected serially, the second bracket interconnected between the first and third brackets.

4. The system of claim 2, wherein the base is affixed to the housing.

5. The system of claim 4, wherein the second bracket is adjustably supported with second fasteners by the first bracket for movement in the second dimension.

6. The system of claim 5, wherein the third bracket is adjustably supported with third fasteners by the second bracket for pivoting in the third dimension.

7. The system of claim 3, wherein the first dimension is roll, the second dimension is pitch, and the third dimension is yaw.

8. A camera monitor system (CMS) for a vehicle, comprising:
- a wing including a housing configured to be secured to the vehicle;
- a camera assembly having a camera mounted to the wing with a bracket assembly, the camera including an image capture unit configured to provide a desired field of view of the vehicle;
- a display configured to depict at least a portion of the field of view; and
- a controller in communication with the camera and the display;

wherein the bracket assembly comprises first, second, and third brackets configured for adjustment of the camera with respect to first, second, and third dimensions;

wherein the first bracket is adjustably supported with first fasteners by a base for movement in the first dimension, the base affixed to the housing, the first, second, and third brackets are connected serially, the second bracket interconnected between the first and third brackets, and one of the base, the first bracket, the second bracket, and the third bracket includes a dial, and an adjacent one of the base, the first bracket, the second bracket, and the third bracket to the one of the base, the first bracket, the second bracket, and the third bracket includes an indicator next to the dial, a relative position of the indicator to the dial being indicative of a position in a corresponding camera dimension provided by the one of the first bracket, the second bracket, and the third bracket.

9. The system of claim 8, wherein the first bracket includes the dial, and the base includes the indicator positioned to indicate a position of the camera in the first dimension.

10. A method of adjusting a camera monitor system in a vehicle, the method comprising:

adjusting a position of a camera disposed in a wing including a housing configured to be secured to the vehicle, the adjusting including:

moving a first bracket relative to a base to a desired position in a first dimension;

moving a second bracket relative to the first bracket to a desired position in a second dimension; and moving a third bracket relative to the second bracket to a desired position in a third dimension, the camera mounted to the third bracket;

wherein the first bracket is adjustably secured to a base by a plurality of first fasteners so as to permit adjustment of the first bracket relative to the base along a first dimension, and each of the base, the first bracket, and the second bracket defines a respective opening for wiring of the camera to extend through.

11. The method of claim 10, wherein the first dimension is roll, the second dimension is pitch, and the third dimension is yaw.

12. The method of claim 11, the method comprising:

determining a change in vehicle position in at least one of a yaw, pitch, and roll directions, wherein the adjusting is based on the determined change.

13. The method of claim 10, the method comprising:

after the adjusting, securing a cover to the wing.

14. The method of claim 10, the method comprising:

before the adjusting step, removing a portion of the wing to access at least one of the base, the first bracket, the second bracket, and the third bracket.

15. The method of claim 10, the method comprising, before the adjusting step, unlocking at least one of the base, the first bracket, the second bracket, and the third bracket.

16. The method of claim 15, wherein the unlocking step includes loosening at least one fastener.

17. The method of claim 10, the method comprising:

locking the first bracket in position with a fastener.

18. The method of claim 10, wherein the first bracket, the second bracket, and the third bracket are connected serially and positioned in a nested configuration, with the second bracket interconnected between the first and third brackets.

19. The method of claim 18, wherein the first dimension is roll, the second dimension is pitch, and the third dimension is yaw, the method comprising:

determining a change in vehicle position in at least one of a yaw, pitch, and roll directions, wherein the adjusting is based on the determined change.

* * * * *